United States Patent
Linnell et al.

(10) Patent No.: US 9,441,820 B1
(45) Date of Patent: Sep. 13, 2016

(54) SYSTEMS AND METHODS FOR INTEGRATING LIGHTING EFFECTS WITH ROBOTS

(71) Applicant: Bot & Dolly, LLC, San Francisco, CA (US)

(72) Inventors: Jeffrey Linnell, Woodside, CA (US); Philip Reyneri, San Francisco, CA (US)

(73) Assignee: Bot & Dolly, LLC, San Francisco, CA (US)

( * ) Notice: Subject to any disclaimer, the term of this patent is extended or adjusted under 35 U.S.C. 154(b) by 42 days.

(21) Appl. No.: 14/333,423

(22) Filed: Jul. 16, 2014

Related U.S. Application Data

(60) Provisional application No. 61/847,075, filed on Jul. 16, 2013.

(51) Int. Cl.
  *F21V 21/14* (2006.01)

(52) U.S. Cl.
  CPC ..................... *F21V 21/14* (2013.01)

(58) Field of Classification Search
  CPC ............... B25J 9/0084–9/0087; B25J 9/1615; B25J 9/1656; B25J 9/1669; B25J 9/1679–9/1682; B25J 9/1692; B25J 11/003–11/0035; B25J 15/00; B25J 15/0019; B25J 15/0028; F21V 21/00; F21V 14/02–14/04; F21V 21/14–21/145; Y10S 901/02; Y10S 901/14; Y10S 901/30; Y10S 901/50
  USPC ........ 700/245, 247, 250, 254; 901/2, 14–15, 901/30, 50; 362/233, 284, 419
  See application file for complete search history.

(56) References Cited

U.S. PATENT DOCUMENTS

| | | | |
|---|---|---|---|
| 4,652,205 A | 3/1987 | Ross et al. | |
| 5,083,073 A | 1/1992 | Kato | |
| 5,510,993 A | 4/1996 | Williams et al. | |
| 2005/0021177 A1* | 1/2005 | Bacchi | B25J 9/1692 700/245 |
| 2008/0316306 A1 | 12/2008 | Burkle et al. | |
| 2009/0234788 A1* | 9/2009 | Kwok | G06N 3/006 706/46 |
| 2009/0240372 A1* | 9/2009 | Bordyn | B25J 9/1692 700/259 |
| 2010/0114373 A1* | 5/2010 | Hale | B25J 19/06 700/258 |
| 2010/0174407 A1* | 7/2010 | Fukawa | B23K 26/04 700/245 |
| 2010/0176270 A1* | 7/2010 | Lau | B25J 9/1692 250/203.2 |
| 2012/0188350 A1 | 7/2012 | Hammond et al. | |
| 2013/0274921 A1* | 10/2013 | Aiso | G05D 3/00 700/251 |

\* cited by examiner

*Primary Examiner* — Bao Long T Nguyen
(74) *Attorney, Agent, or Firm* — McDonnell Boehnen Hulbert & Berghoff LLP

(57) ABSTRACT

Example systems and methods may provide for coordination between one or more light sources and one or more robotic devices. One example system includes a first device actor including an end effector coupled to a robotic device, where the robotic device has two or more degrees of freedom. The system may further include a second device actor including a movable light source, where the movable light source has at least one degree of freedom. The system may additionally include a control system that is configured to control movements of at least one of the first and second device actors to coordinate movement of a light beam from the movable light source with movement of the end effector.

17 Claims, 20 Drawing Sheets

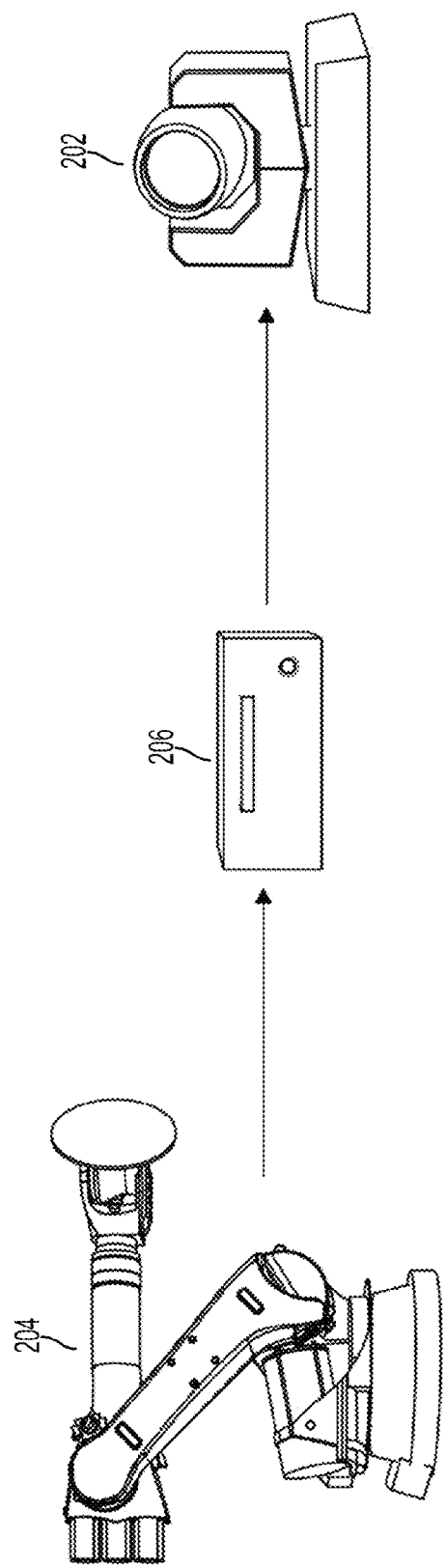

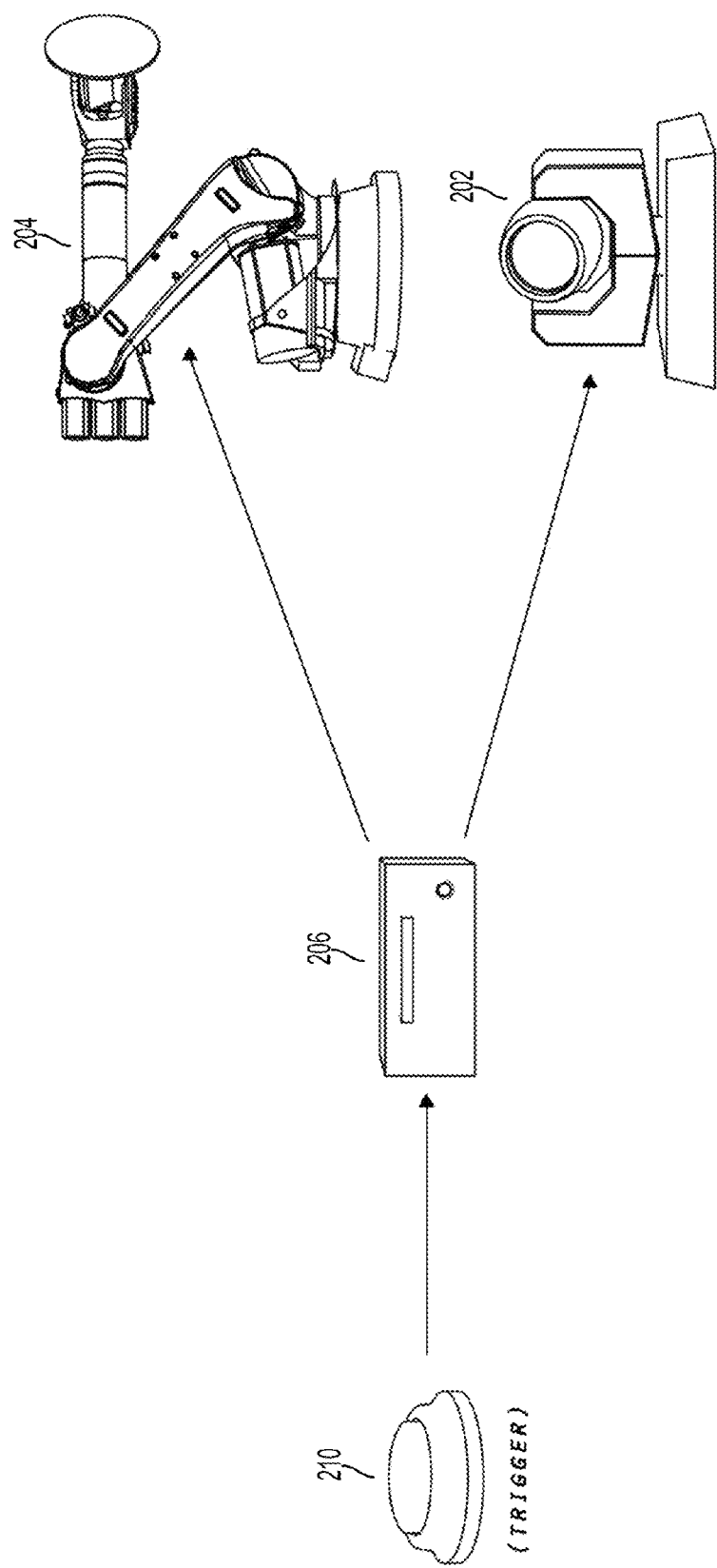

SYSTEMS AND METHODS FOR INTEGRATING LIGHTING EFFECTS WITH ROBOTS

CROSS REFERENCE TO RELATED APPLICATION

The present application claims priority to U.S. Provisional patent application Ser. No. 61/847,075, filed on Jul. 16, 2013, and entitled "Systems and Methods for Integrating Lighting Effects with Robots," which is herein incorporated by reference as if fully set forth in this description.

BACKGROUND

Unless otherwise indicated herein, the materials described in this section are not prior art to the claims in this application and are not admitted to be prior art by inclusion in this section.

Projected beams of light are sometimes used in the entertainment industry to create laser light shows. For instance, a light show may consist of projected light beams to accompany a musical performance or some other type of entertainment. Laser projectors or other lighting fixtures may be used to project different types of light beams, such as light beams with different colors or frequencies. A computing device may be used to control the projectors through a standard protocol for stage lighting and effects, such as DMX, in order to control aspects of a light show, including directions, sizes, colors, and patterns of projected light beams.

SUMMARY

Example methods and systems may provide for coordination between one or more light sources and one or more robotic devices. In one example, a movable light source may be controlled to project a light beam at an end effector of a robotic device. Movement of the light source and/or the robotic device may be controlled so that the projected light beam is coordinated with movement of the end effector. The end effector may have one or more reflective surfaces, such as a mirror or disco ball, to reflect the projected light beam (e.g., as part of a coordinated laser light show).

In one example, a system is provided that includes a first device actor including an end effector coupled to a robotic device, where the robotic device has two or more degrees of freedom. The system may further include a second device actor including a movable light source, where the movable light source has at least one degree of freedom. The system may additionally include a control system that is configured to control movements of at least one of the first and second device actors to coordinate movement of a light beam from the movable light source with movement of the end effector.

In another example, a system is provided that includes a first device actor including a first robotic device and an end effector coupled to the first robotic device, where the first robotic device is operable to move the end effector with two or more degrees of freedom. The system may further include a second device actor including a second robotic device and a light source coupled to the second robotic device, where the second robotic device is operable to move the light source with two or more degrees of freedom. The system may also include a control system that is configured to control movements of at least one of the first robotic device and the second robotic device to coordinate movement of a light beam from the light source with movement of the end effector.

In still another example, a method is provided that includes controlling, by a computing device, movements of a movable light source, where the movable light source is movable with at least one degree of freedom, causing the movable light source to project a light beam, and controlling, by the computing device, movements of a robotic device that is movable with two or more degrees of freedom to coordinate movement of the projected light beam with movement of an end effector coupled to the robotic device.

In yet another example, a system may include means for controlling movements of a movable light source, where the movable light source is movable with at least one degree of freedom, means for causing the movable light source to project a light beam, and means for controlling movements of a robotic device that is movable with two or more degrees of freedom to coordinate movement of the projected light beam with movement of an end effector coupled to the robotic device.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2D illustrates a further example control flow for a lighting system, according to an example embodiment.

FIG. 2E illustrates an additional example control flow for a lighting system, according to an example embodiment.

DETAILED DESCRIPTION

I. Overview

Figure 1:
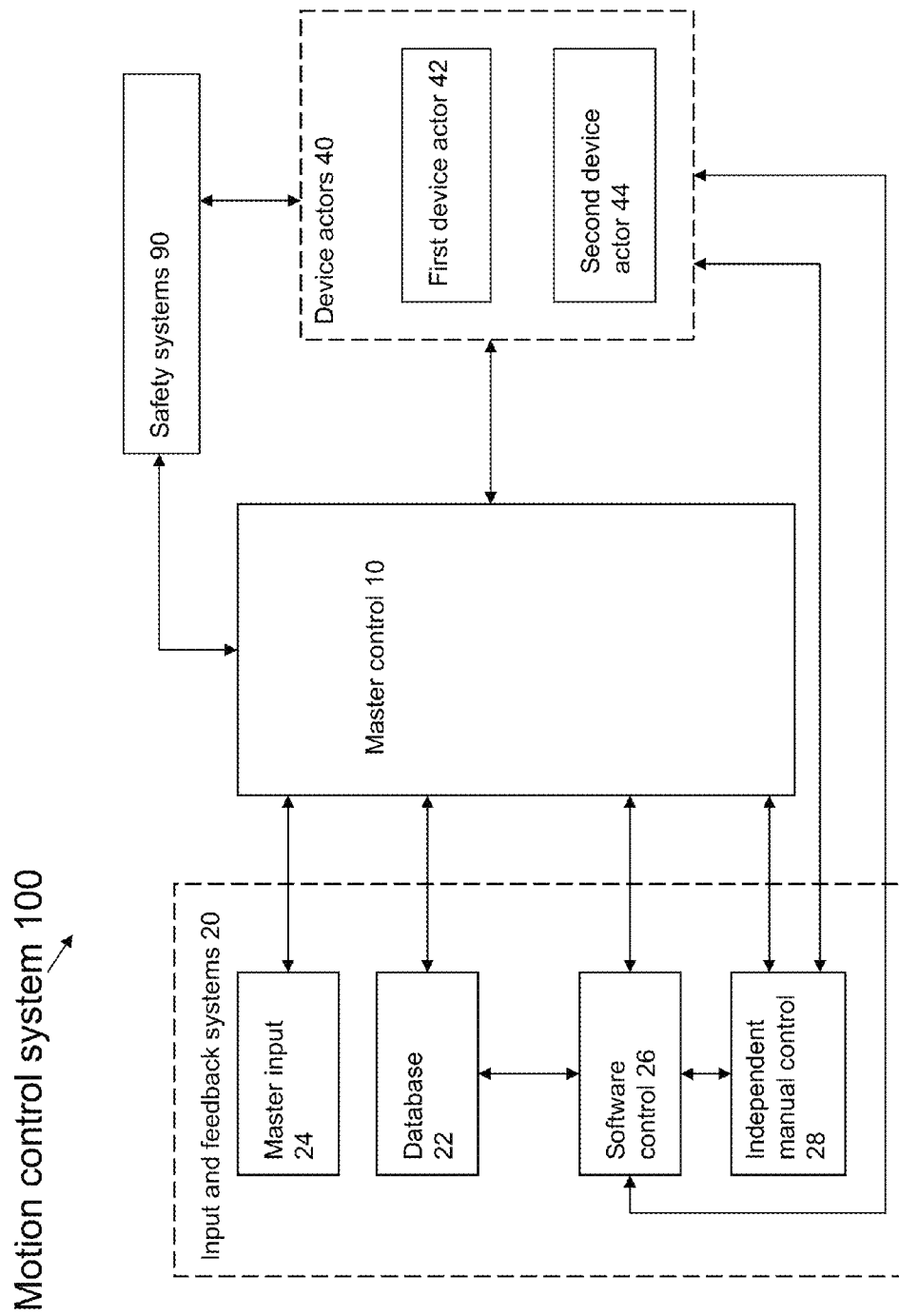
FIG. 1 shows a block diagram of a motion control system, according to an example embodiment.

Example embodiments disclosed herein include systems and methods for integrating lighting effects with robots. More specifically, an adaptable and programmable system may integrate multiple components into a master system to provide coordinated motion of light beams and robots. Although embodiments will be illustrated with reference to specific implementations, a person of ordinary skill in the art will understand that the systems and methods described below may have broad use other than the specifically described implementations.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

In an example embodiment, a light beam from a light source may be directed at an end effector located on a robot. The end effector may be a device located at the end of a robotic arm, such as a mirror. A control system may be used to coordinate movements of the light source and the end effector. As the end effector and/or light source move over time, the beam of light from the light source may remain directed towards the end effector in a manner that maintains certain reflective and/or positioning characteristics of the beam and/or a reflected beam. In some applications, the light beam may stay aimed directly at the end effector as the end effector moves in space. In further examples, the light beam may offset its aim in space to illuminate an object attached to the end effector as the end effector moves. In additional examples, the light beam may offset its aim in time to create a leading or following effect.

In some examples, a system may involve more than one robot and/or more than one light source. In such systems, a control system may be used to coordinate each of the robots and lights. Such a control system may be able to coordinate sub-millimeter positions of robots and lights in space to provide highly accurate computer synchronization of events. Additionally, in some examples, the lights may have other attributes to command besides aim, such as color or gobo effects. In such examples, the other attributes may be coordinated with the rest of the system as well.

Example systems may involve one component of the system acting as a master, such as a robot, a light source, or a network-connected computing device. The other components of the system may be "slaved" to the component designated as the master in order to maintain positioning relationships between the components.

In some examples, a computing device such as a PC workstation with network connections to the robot(s) and the moving light(s) may serve as the master control system. The computing device may send a stream of control values in real time to the robot(s) and the light(s) to keep them synchronized. In further examples, these control values may include location, orientation, and/or velocity.

In additional examples, a light source may serve as the master. The light source may control its own position and/or orientation over time. Additionally, the light source may send a real-time data stream of its current position and/or orientation to a computing device which may control a robot. The computing system may then command the position and/or orientation of the robot in real time based on information about the light source. In some examples, the computing system may be programmed to compensate for latency arising from the transfer of data.

In further examples, a robot may serve as the master. The robot may control its own position and/or orientation over time. Additionally, the robot may send a real-time data stream of its current position and/or orientation to a computing device which may control a light source based on information about the robot. The computing system may then command the position and/or orientation of the light source in real time.

An illustrative control system may be configured to control the movements of the robot(s) and the light source(s) over a certain predefined timeline. The timeline may indicate specific control actions to be carried out at specific times, such that the robot(s) and/or the light source(s) move according to certain input parameters or constraints.

The relationship between the different components of the system may involve any amount of programmable complexity. For instance, in a simple case, a light may simply be fixed on an end effector as the robot moves. In other examples, by manipulating sliders, angles, keyframes, and 3D positions, the user can describe the geometric constraints that should be maintained to achieve the desired effect. For example, a constraint could indicate that a particular location on the ceiling or another surface should remain illuminated while the light source and/or end effector are in motion. In a further example, a particular angle of reflection may be maintained as one or more of the components moves. In a more complex example, the pose of two end effectors may be driven by a pre-programmed path of a moving light source so that the end effectors maintain a geometric relationship that bounces the light to a specific point elsewhere in the room. Other examples are also possible.

In some examples, additional elements capable of subscribing or publishing to real-time data streams may be coordinated by the system as well. For instance, a user may be able to use an input device to adjust the offset between a light beam and an end effector in real time. In another example, an audio system may be synchronized with the light(s) and robot(s), either as a master or a slave. Additionally, besides streams of data, outputs or inputs may be in the form of discrete events. For instance, the trigger of an individual stepping on a force-sensitive dance floor may initiate particular movements of the light source(s) and/or robot(s).

In some examples, light source(s) may be controlled by a computing device using DMX, or some other serial communications protocol. For instance, one of a variety of different types of DMX, including AMX, ArtNet (DMX over ethernet), RDM, or some other manufacturer specific protocol may be used. In other examples, the computing device may interface directly with motors controlling the lights(s) via a motor controller or another digital-to-analog converter. The computing device may additionally interface with the robot(s) or other industrial automation components via fieldbus technologies like EtherCAT, Profibus, or DeviceNet.

Further, the controlling computing device may simultaneously control multiple lights using different forms of DMX, using direct control of motors, and/or other types of communication protocols. In additional examples, the controlling computing device may he connected to the other components via the internet, via a local-area network, and/or via another communication interface.

II. Example Control Systems

FIG. 1 describes a motion control system 100. Motion control system 100 may be part of a motion controlled set used to coordinate positions and orientations of device actors such as robots and/or light sources within the system. Motion control system 100 may include a master control 10, input and feedback systems 20, device actors 40, and safety systems 90. From the most basic perspective, motion control system 100 may function when an input system 20 provides instructions to a device actor 40 via master control 10.

A scene may include a set of motions and actions by device actors 40 over a continuous period of time, such that lights may be projected in certain directions and/or along certain pre-planned paths. At a beginning of a scene, the device actors may begin in a first position. Motion control of device actors 40 may then move the device actors through a sequence of motions that may involve changes in location, orientation, and/or velocity to the end of a scene. Alternatively, some or all of device actors 40 may be controlled in real-time on an ad-hoc basis (e.g., without following any pre-planned paths). In such an embodiment, master control 10 may receive input via a front-end user interface, which indicates how certain device actors 40 should move and/or relationships between the device actors 40. The master control 10 may then use such input to generate a set of control signals in real-time for some or all of the device actors 40.

In one potential embodiment as part of a motion control system 100, input and feedback systems 20 may include a database 22, a master input 24, a software control 26, and an independent manual control 28. As part of the input and feedback systems 20, database 22 may operate to provide a set of timing and position data to direct all or a portion of device actors 40. Alternatively, database 22 may store data being created by manual or individual movement or data input related to the operation and function of device actors 40. Database 22 may also store data created independently of device actors 40, such as data created using software modeling features of a software control 26.

A master input 24 may be a device that functions to operate all of the device actors 40 associated with a particular scene being created with motion control system 100. Master input 24 may function by sending input control signals to master control 10. Master control 10 may then adapt the signal from master input 24 to send individual control signals to a plurality of actors operating as device actors 40 for the particular scene. In one potential embodiment, every individual device of device actors 40 may be provided a control signal from master control 10 when a signal is received from master input 24, including a signal to maintain a status quo or non-action to devices that are not operating as device actors 40 for a particular scene. In an alternative embodiment, a portion of the device actors connected as part of motion control system 100 may not be sent any signal from master control 10 as part of the operation of motion control system 100 for a particular scene.

In further examples, software control 26 may act as a replacement for master input 24 in sending control signals to the plurality of device actors via the master control 10. Alternately, software control 26 may control individual devices from among device actors 40 to alternate, change, or experiment with motions of the individual device. In other potential embodiments, software control 26 may function to model the behavior of individual devices of device actors 40 within a virtual environment. In such an embodiment, software control 26 may contain a software model for an individual device, which may allow control signals to be created for the device without actually sending the control signals to the device. The control signals may then be stored in the software control 26, in database 22, within a computer memory component that may be part of master control 10, or within computer memory that may be part of the device of device actors 40 for which the controls are being created. After the control signal is created by software control 26 and propagated to the appropriate storage location, a master control signal from software control 26 or from master input 24 may activate the control signal for the individual device to act in conjunction with other device actors 40.

Any device of device actors 40 may additionally have an independent manual control 28. As described above with respect to software control 26, control signals for an individual device may be created in software modeling. Similarly, a device may have independent manual control 28 that may be used to operate a device of device actors 40. When a set of instructions is being created for the entire scene, the independent manual control 28 may be given input commands over time that are recorded to database 22 or a memory device of master control 10. During creation of a set of instructions using independent manual control 28, the independent manual control 28 may communicate directly with the associated device of device actors 40. Alternatively, the independent manual control 28 may send the control signal to master control 10, which then conveys the signal to the associated device of device actors 40. The control signal may then be created either from the signal of the independent manual control 28, of from a measured feedback reading created by the operation of the associated device.

In additional examples, independent manual control 28 may control the associated device during control signal creation in order to view the results. In other examples, control signals may be created without controlling the device. For example, if input signals are expected for certain time marks, an independent manual control 28 may be operated independent of the related device, and the control operations may be recorded. Instructions for individual device actors of device actors 40 may therefore be integrated into a motion controlled scene as part of motion control system 100.

While master control 10 may be operable to control all device actors 40 simultaneously, one of the device actors may also function as a "master," to which the master control 10 slaves the other device actors. For instance, consider a configuration with a master control system and two actor devices, which include a first robotic device with an end effector and a movable light source.

Figure 2A:
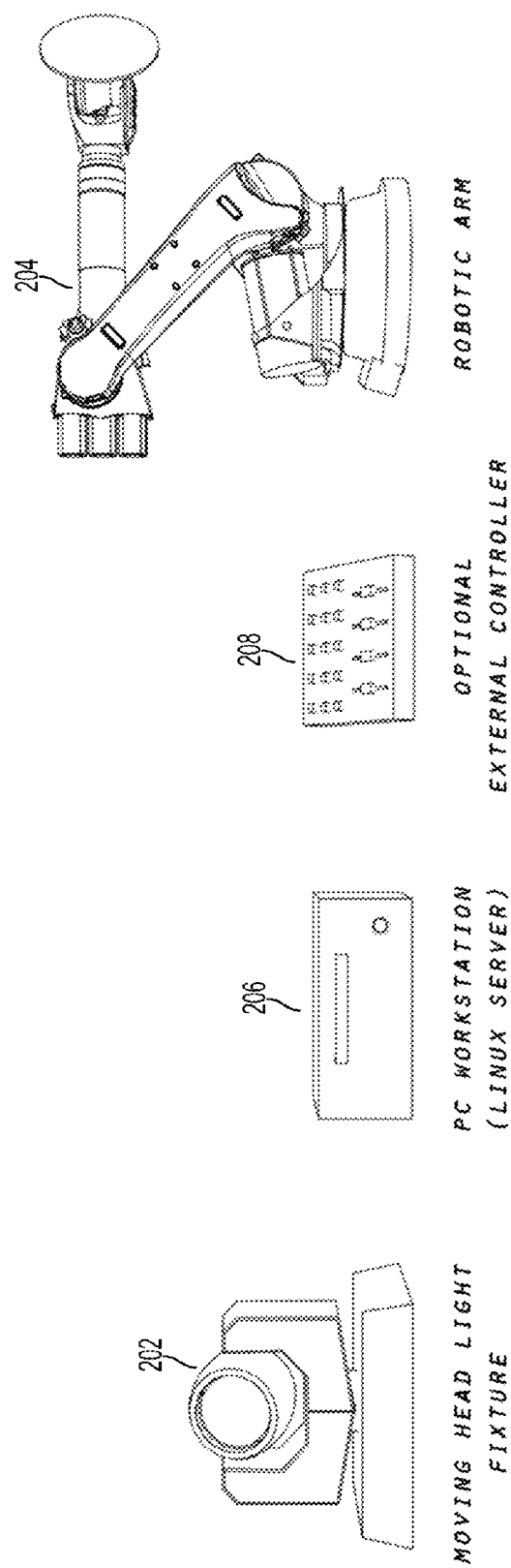
FIG. 2A illustrates components of a lighting system, according to an example embodiment.

FIG. 2A shows illustrative components of such an example system. More specifically, FIG. 2A shows a moving head light fixture 202 (e.g., the movable light source), a robotic arm 204 (e.g., the robotic device to which an end effector can be attached), and a PC workstation 206 on which the control system can be implemented. The PC workstation 206 can communicate with the moving head light fixture 202 and the robotic arm 204 to send and/or receive control signals. In further examples, an optional external controller 208 may also function to send and/or receive control signals to one or more device actors as well.

Figure 2B:
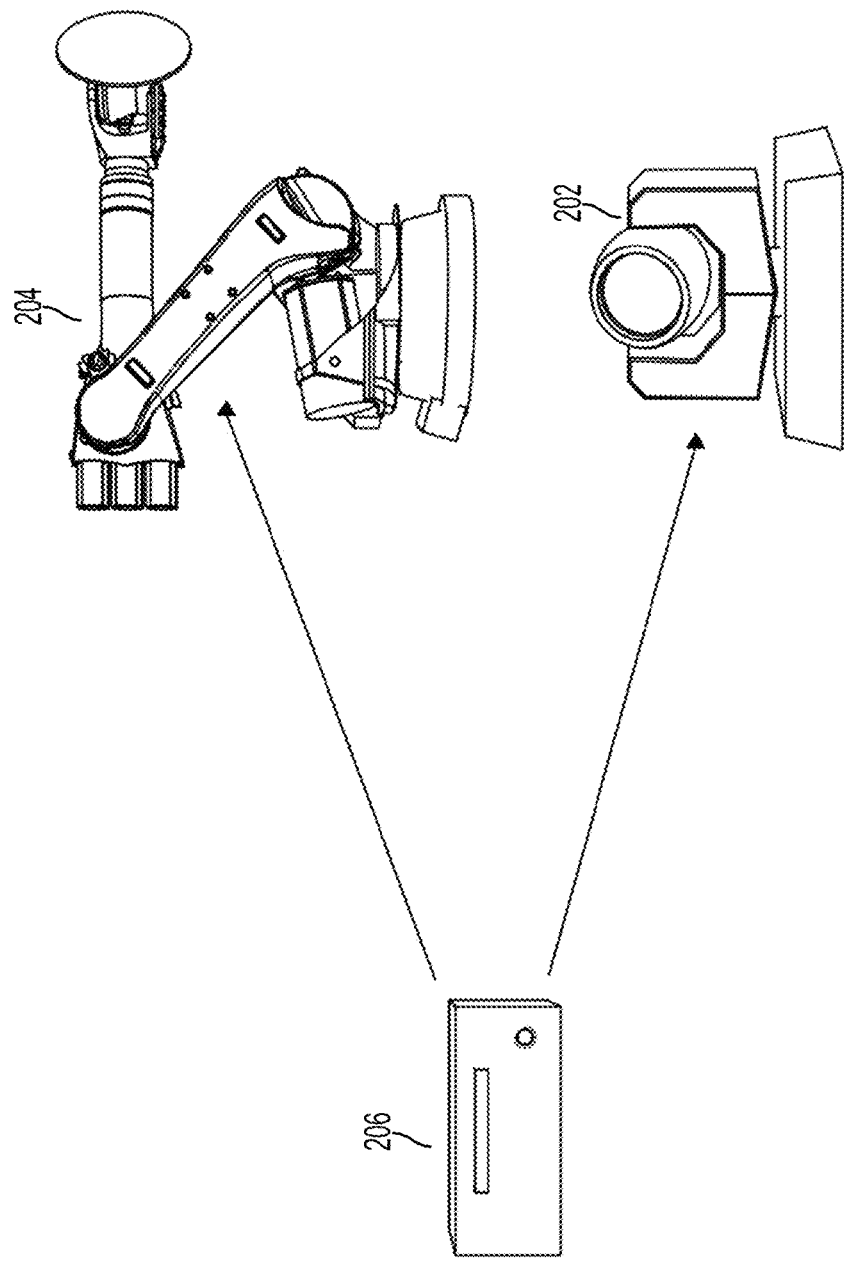
FIG. 2B illustrates an example control flow for a lighting system, according to an example embodiment.

With this arrangement, the control system may control movements of both the first robotic device and the movable light source as slave units. As such, the control system may coordinate movements based on one or more relational parameters, where each relational parameter is indicative of a relationship between the light source and the end effector. For example, as shown in FIG. 2B, the PC workstation 206 that implements the control system may use a robot control language or another type of communication protocol to control robotic arm 204 via a fieldbus connection or another type of connection. Further, the PC workstation 206 may use DMX signaling to control the moving head light fixture 202.

Figure 2C:
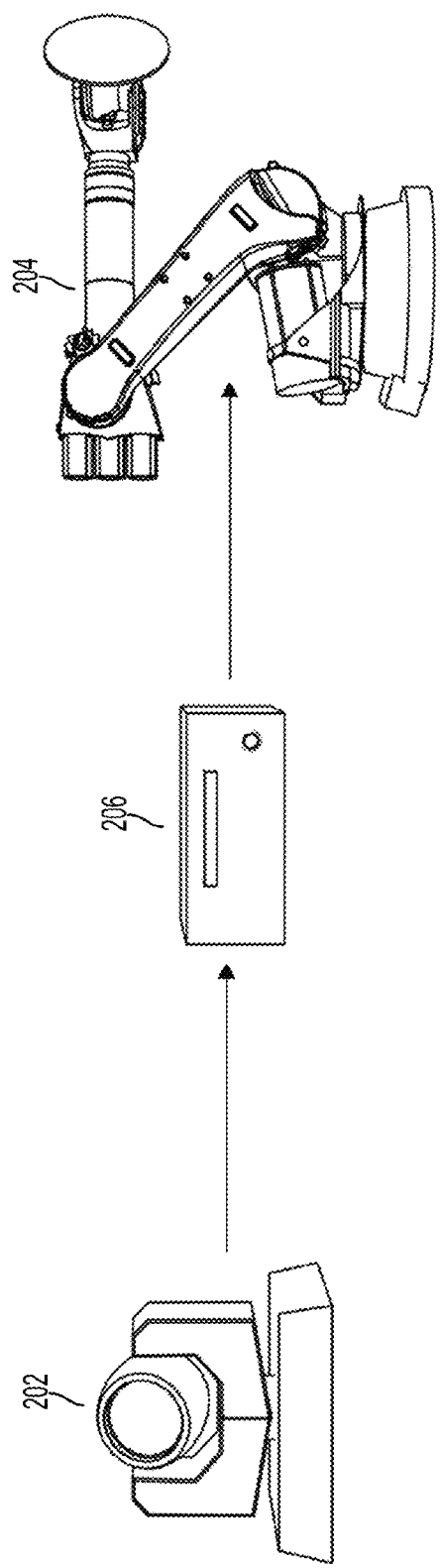
FIG. 2C illustrates another example control flow for a lighting system, according to an example embodiment.

In a further arrangement, the movable light source could be treated as the master device actor, to which the robotic device with the end effector is slaved. As such the master control system may receive a data stream that indicates positioning of the light source, and may generate a second data stream for control of the first robotic device. In this example, the second data stream may include instructions (e.g., control signals) for the robotic device that coordinate the positioning of the end effector with the indicated positioning of the light source. For example, as shown in FIG. 2C, moving head light fixture 202 may use DMX signaling to send the PC workstation 206 a data stream indicating its current positioning (e.g., orientation and/or pose). PC workstation 206 may then generate control signals for the robotic arm 204 so as to maintain a certain spatial and/or orientational relationship(s) between the light beam from moving head light fixture 202 and an end effector attached to robotic arm 204. As such, the PC workstation 206 may send the generated control signals to the robotic arm 204 via a fieldbus connection or another type of connection. Further, in some embodiments, the above process may be implemented in real-time.

In another arrangement, the robotic device could be treated as the master device actor, to which the movable light source is slaved. As such, the master control system may receive a data stream that indicates positioning of the robotic device (and/or the positioning and/or orientation of an end effector attached to the end of the robotic device). Based on the indicated positioning, the control system may generate a second data stream for control of the movable light source. In this example, the second data stream may include instructions (e.g., control signals) for the movable light source so that the indicated pose of the light source is coordinated with the pose of the end effector. For example, as shown in FIG. 2D, robotic arm 204 may use a fieldbus connection or another tape of connection to send the PC workstation 206 a data stream indicating its current positioning (e.g., orientation and/or pose). PC workstation 206 may then generate control signals for the moving head light fixture 202 so as to maintain a certain spatial and/or orientational relationship(s) between an end effector attached to robotic arm 204 and the light beam emitted from moving head light fixture 202. As such, the PC workstation 206 may send the generated control signals to the moving head light fixture 202 using DMX signaling, or using another type of communication protocol. Further, in some embodiments, the above process may be implemented in real-time.

In some examples, additional controllers capable of publishing and subscribing to real-time data streams may be coordinated by the system as well. For instance, a user using a computing device with a wireless connection to a workstation may be able to adjust the offset of a light beam and an end effector in real time. In some instances, the workstation may send events instead of streams of data. FIG. 2E shows an example of a trigger 210 that may be used by an individual, for example, on a force-sensitive dance floor. The trigger 210 may send a message to a workstation 206 that may initiate movement of a light source 202 and/or a robot 204.

Figure 2F:
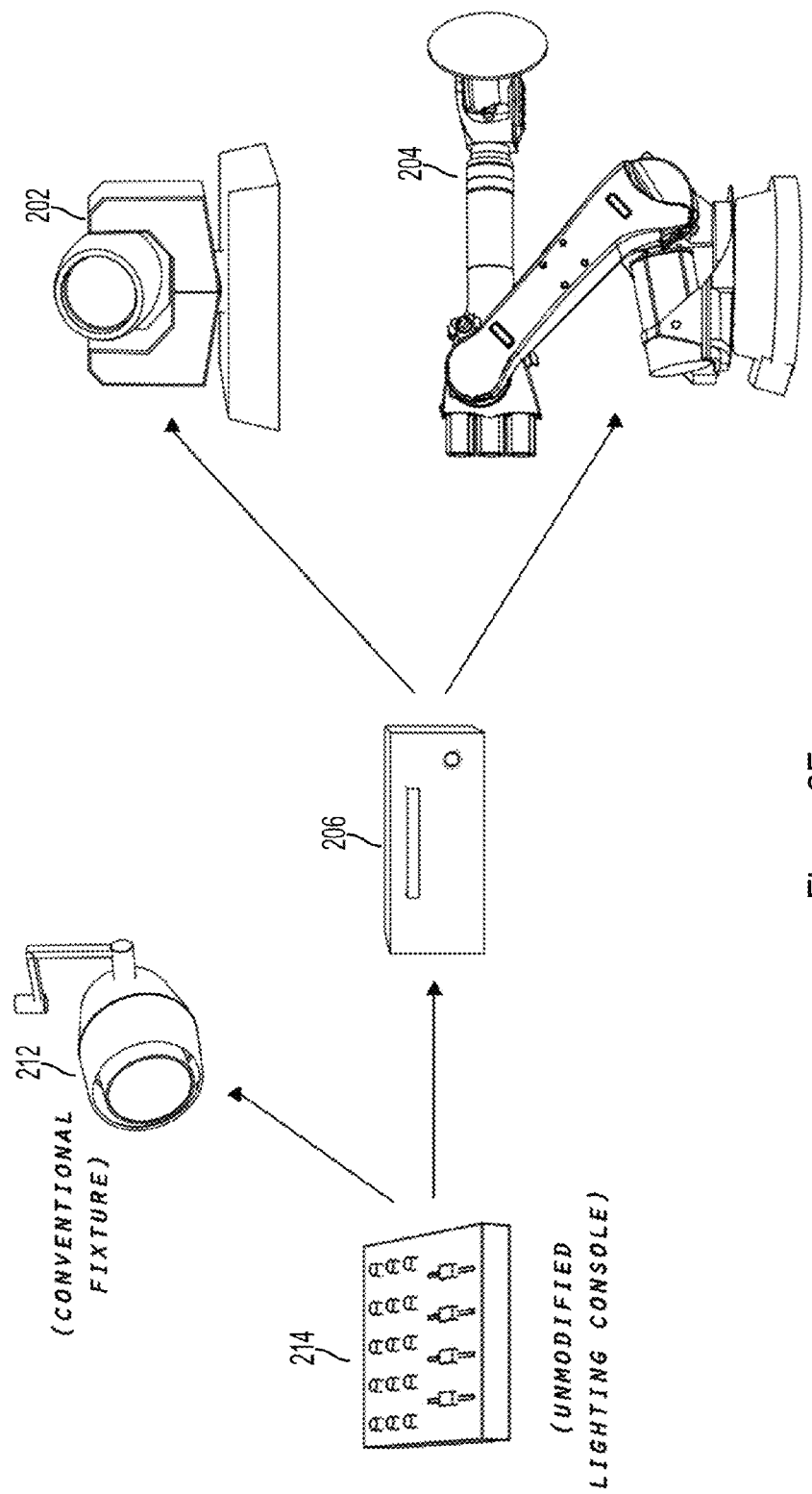
FIG. 2F illustrates yet another example control flow for a lighting system, according to an example embodiment.

Another example of an external controller that may interface with the workstation is an industry-standard lighting console 214. FIG. 2F shows an example lighting console 214. The unmodified lighting console may send control signals directly to a conventional lighting fixture 212. Additionally, by routing control signals from the unmodified lighting console 214 through a workstation 206, the workstation 206 may selectively override certain control signals to inject 3D-aware control values while the lighting console 214 retains control over all the other cues and/or effects. For instance, the workstation may selectively override pan/tilt channels to inject three-dimensional position-aware pan/tilt values while the lighting console retains control over all other lighting cues/effects.

III. Example Device Actors

Referring now to FIGS. 3A-3C and 4A-4B, several non-limiting examples of device actors 40 will be described. Although these figures focus on the use of robotic arms, device actors may also include other types of stationary and/or moveable devices, such as sensors, moveable head lights, and signal sources.

Figure 3A:
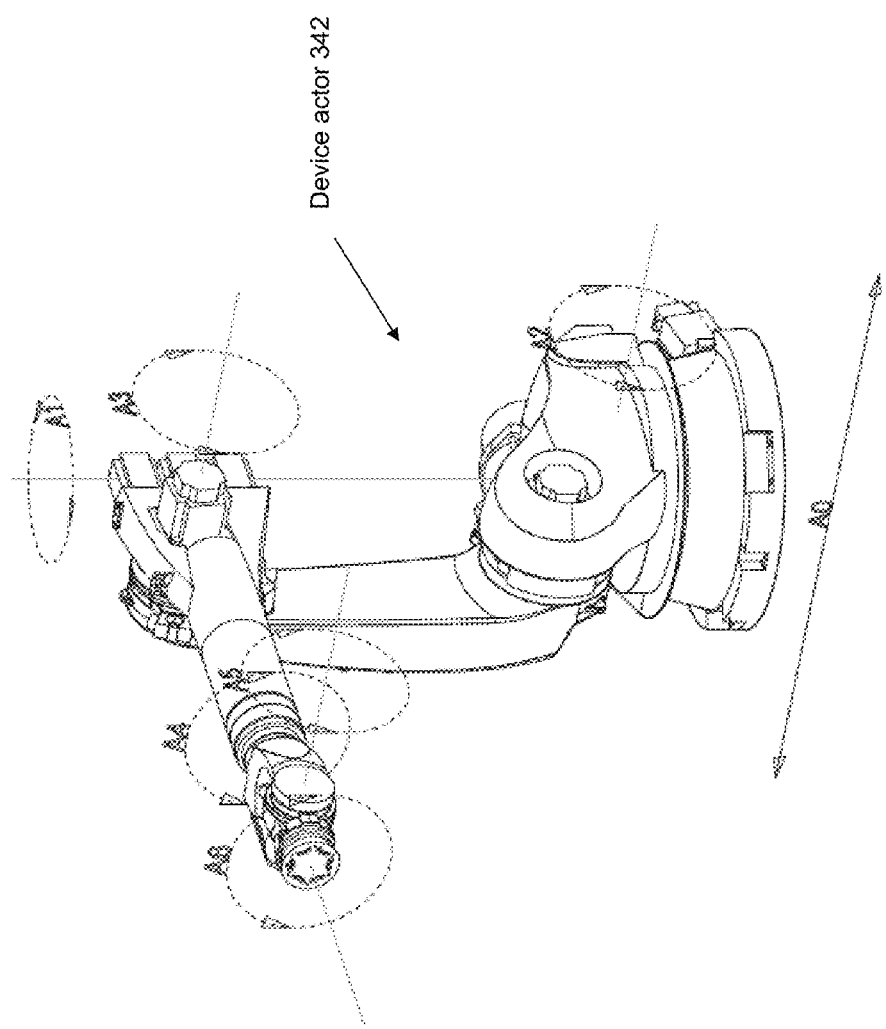
FIG. 3A shows a view of a robotic device with 7 degrees of freedom, according to an example embodiment.

FIG. 3A shows a device actor 342 that includes a robotic arm with six degrees of freedom corresponding to axis A1-A6. Axis A0 associated with a rail which is not shown may allow side to side movement along an additional axis. The robotic arm may be configured to hold a light source, an end effector, or any other relevant device or object. Robotic devices with less than six degrees of freedom may also be used for some or all of the device actors.

Figure 3B:
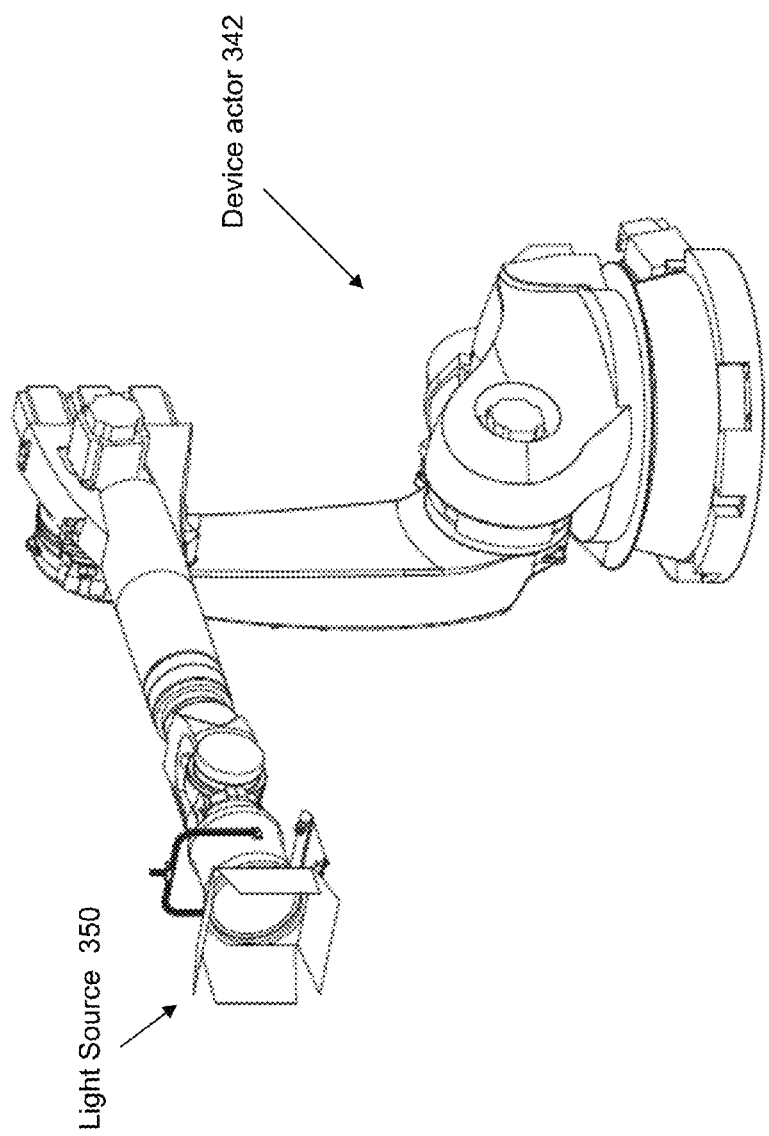
FIG. 3B shows a robotic device with an end-effector-mounted light, according to an example embodiment.

FIG. 3B shows a device actor 342 with a light source 350 placed at a mounting point. In this example, the device 342 may be a robot which controls the position and orientation of the light source 350. A separate control system may also control the position and/or orientation of the robot or light source. In further examples, the light source(s) could be movable light sources with at least one degree of freedom or they could be mounted on robots so that they may have additional degrees of freedom. In some examples, one or more of the light sources could be head light fixtures, such as head light fixtures with the typical two degrees of freedom. Other types of light sources such as laser projectors may be used in addition to/instead of moving head lights. In other examples, one or more of the light sources (such as moving head lights or some other light source) could be mounted to the end effector of a robot. In this configuration, the same possible master/slave combinations may still be used.

Figure 3C:
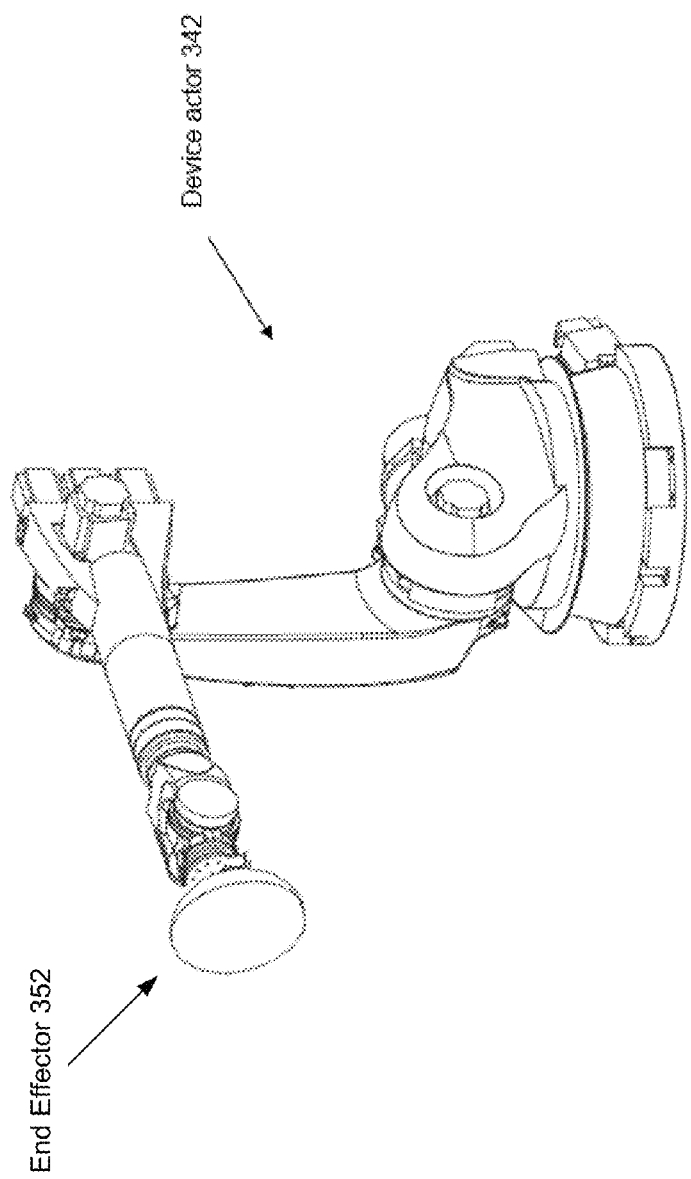
FIG. 3C shows a robotic device with an end-effector-mounted mirror, according to an example embodiment.

FIG. 3C shows a device actor 342 with an end effector 352 placed at a mounting point. The end effector 352 is shown here as a mirror, but the end effector 352 could be anything that may have some effect on a beam of light, such as a different reflective surface or a disco ball, for example. The device actor 342 may be able to control the position and orientation of the end effector 352 in real time. In some examples, multiple end effectors may be used (attached to one or more robots). The end effectors may all be of the same type, or they may be of different types. A control system may be programmed to control the position and/or orientation of the end effector(s) directly or it may control the position and/or orientation of the end effector(s) indirectly by controlling movements of the robot.

Figure 3D:
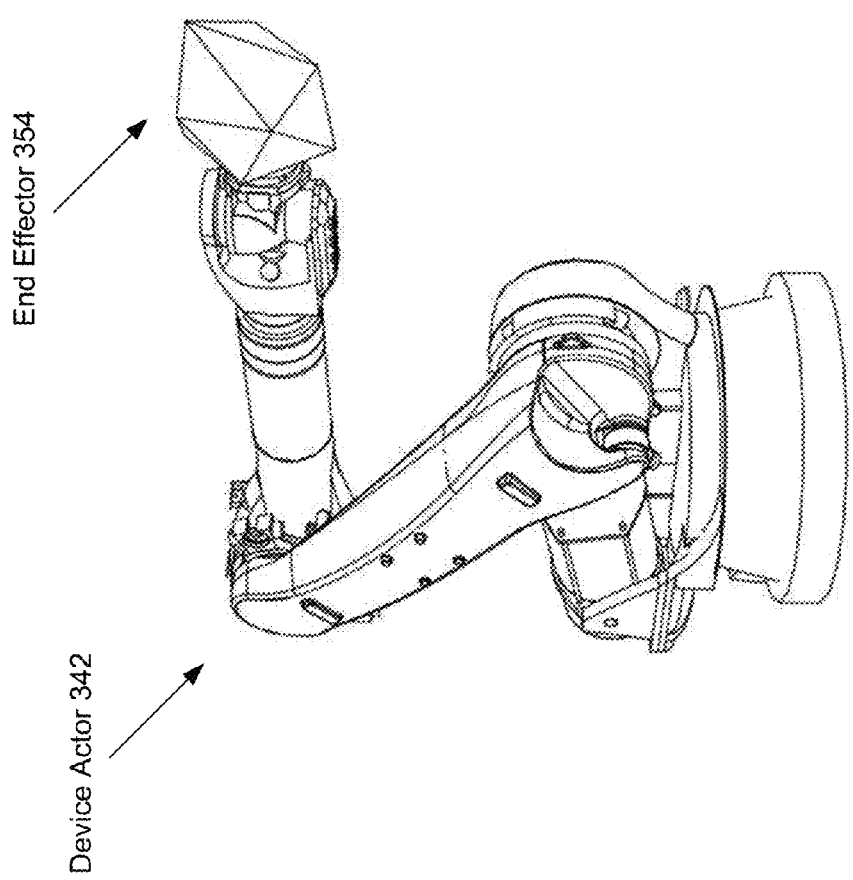
FIG. 3D shows a robotic device with an end effector having multiple reflective surfaces, according to an example embodiment.

An end effector might also have multiple reflective surfaces, as shown by FIG. 3D. In FIG. 3D, the multiple reflective surfaces may adjoin each other along one or more edges and/or at one or more points. When a beam of light strikes such an edge or points, the end effector may split the beam of light, causing the beam to reflect in multiple different directions.

Figure 4B:
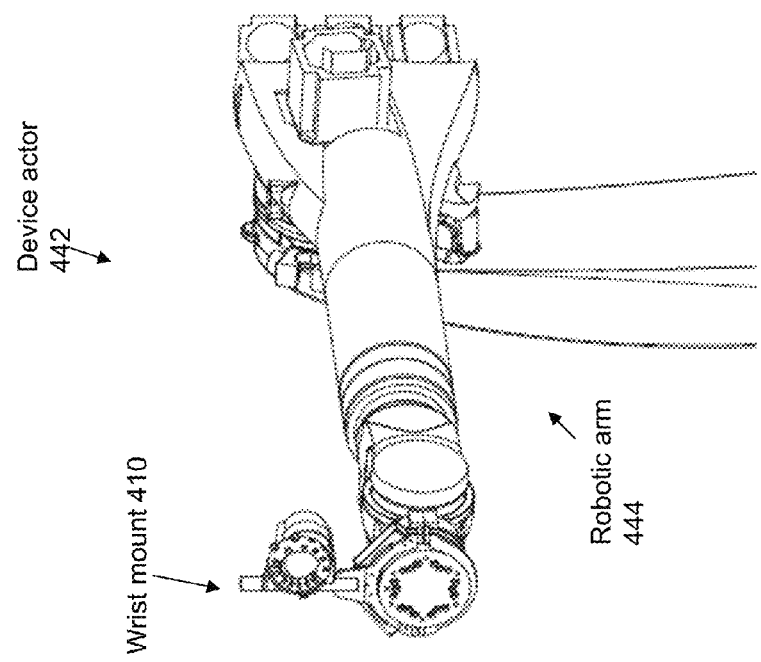
FIG. 4B shows a view of a robot with an attached wrist mount, according to an example embodiment.
Figure 4A:
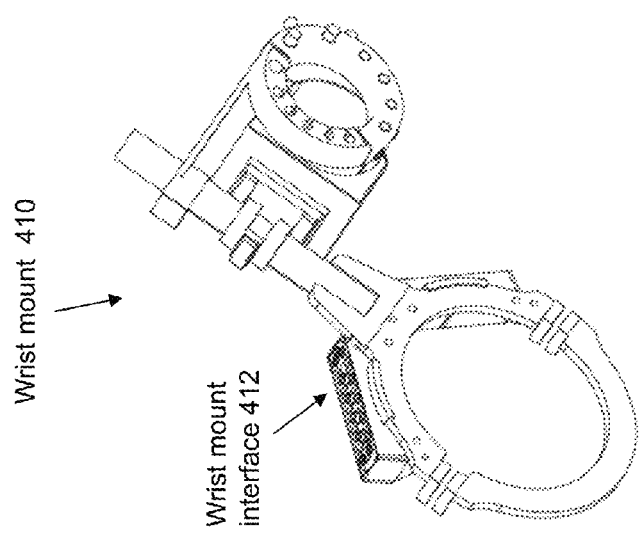
FIG. 4A shows a view of wrist mount for use with a robotic arm, according to an example embodiment.

FIGS. 4A and 4B show an embodiment where a device actor 442 includes a robotic arm 444 with a wrist mount 410 and a wrist mount interface 412. Wrist mount 410 and wrist mount interface 412 may enable multiple device actors to be mounted to robotic arm 444. For instance, multiple light sources and/or end effectors could be mounted to a single robotic arm. In certain embodiments, the wrist mount interface may enable temperature sensors, laser range detectors, microphones, speakers, fans, or other mechanical activated or special effects devices in addition to light sources or end effectors.

In some embodiments, the sun may also be used as a light source for a system with one or more device actors which each include a robotic device with an end effector. Such a system may include a control system that is configured to coordinate movements of the device actors with the sun to reflect sunlight in desired ways. For example, the control system could triangulate sun's location relative to the device actors based on the time of day and GPS coordinates of the device actors. The control system could then control the positioning of end effectors (e.g., mirrors) to attenuate and direct beams of sunlight in a desired manner.

In a further aspect, reflective end effectors may include a top layer of modulated transparency material (e.g., transparency glass). The control system may accordingly adjust the opacity of the modulated transparency material on an end effector to change the opacity of the material, and thus to change the amount of light that is reflected from the end effector.

IV. Example Systems with Two Device Actors

Some example systems may include two device actors that are controllable by a control system. As a specific example, a first device actor may include an end effector mounted to the end of robotic device (e.g., a robotic arm), and the second device actor may include a light source. Further, the end effector may be mounted to a robotic device which is operable to now with two or more degrees of freedom, such as a robotic arm with six degrees of freedom. The light source may be a movable light source having at least one degree of freedom. The system may additionally contain a control system that is configured to control movements of the robotic device and/or the light source so that a light beam from the movable light source may be coordinated with movement of the end effector.

Note that various types of end effectors and combinations of end effectors may be mounted to robotic devices and controlled in a coordinated manner, depending upon the particular implementation. For instance, in some embodiments, a first device actor may include a first robotic device and an end effector (e.g., a mirrored reflector or a disco ball) mounted thereto, and a second device actor may include a second robotic device and a light source mounted to the second robotic device.

Figure 5A:
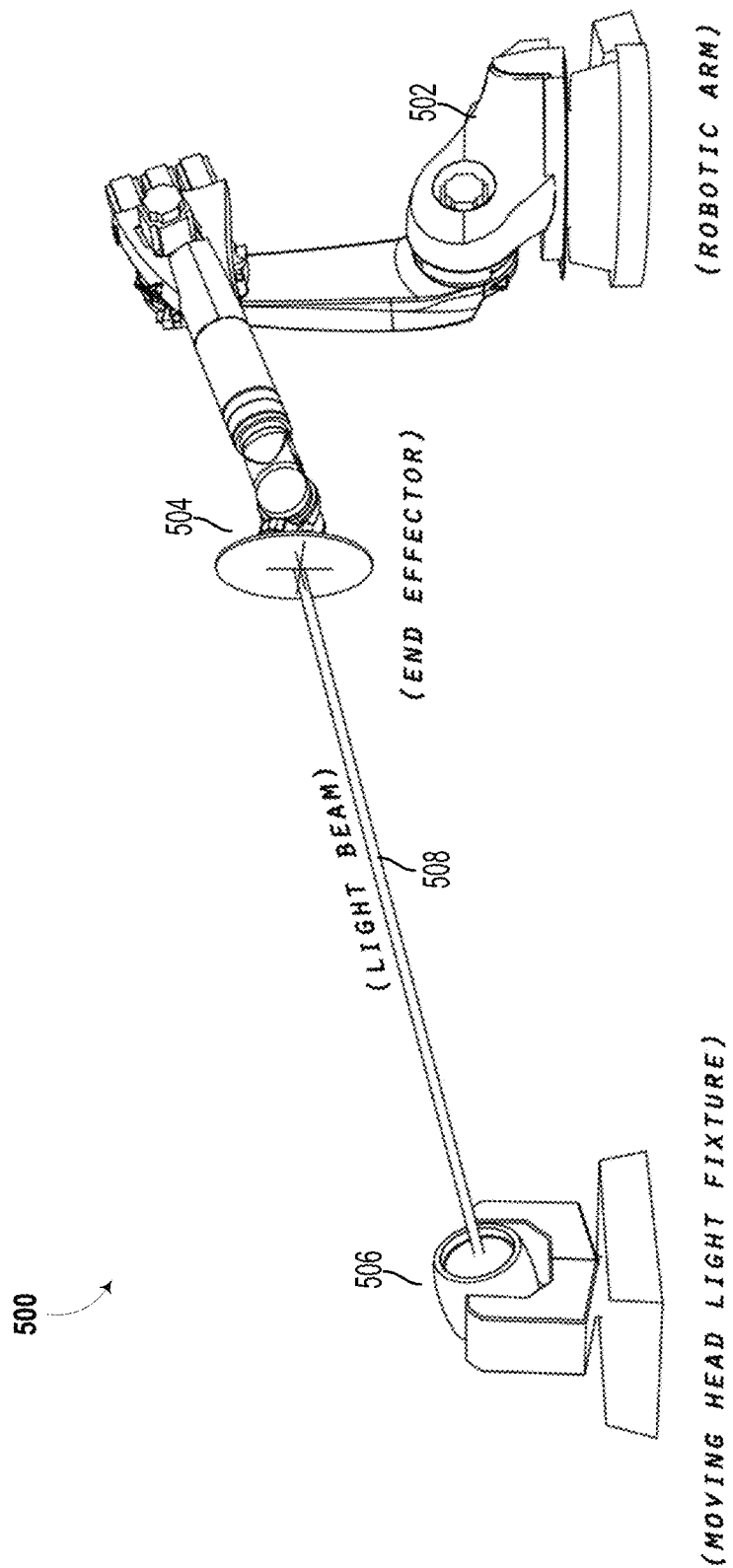
FIG. 5A illustrates a system including a light source and a robotic device with an end effector, according to an example embodiment.

FIGS. 5A-5D show an illustrative system 500 with two device actors: (a) a robotic arm 502 with an end effector 504, which in this case is a mirror, and (b) a moving head light fixture 506. FIG. 5A illustrates an example of a robotic arm 502 that is movable with six degrees of freedom and a moving head light fixture 506 that is movable with two degrees of freedom. However, it should be understood in this and all examples provided herein that the device actors may be configured to move with different degrees of freedom, without departing from the scope of the invention. Further, a control system (not shown) may communicate with the robotic arm 502 and the moving headlight fixture 506 to coordinate movements of the end-effector-mounted mirror 504 with movements of a light beam 508 emitted by moving head light fixture 506, such that certain relationships are maintained as the robotic arm 502 and/or the moving head light fixture 506 move.

Figure 5B:
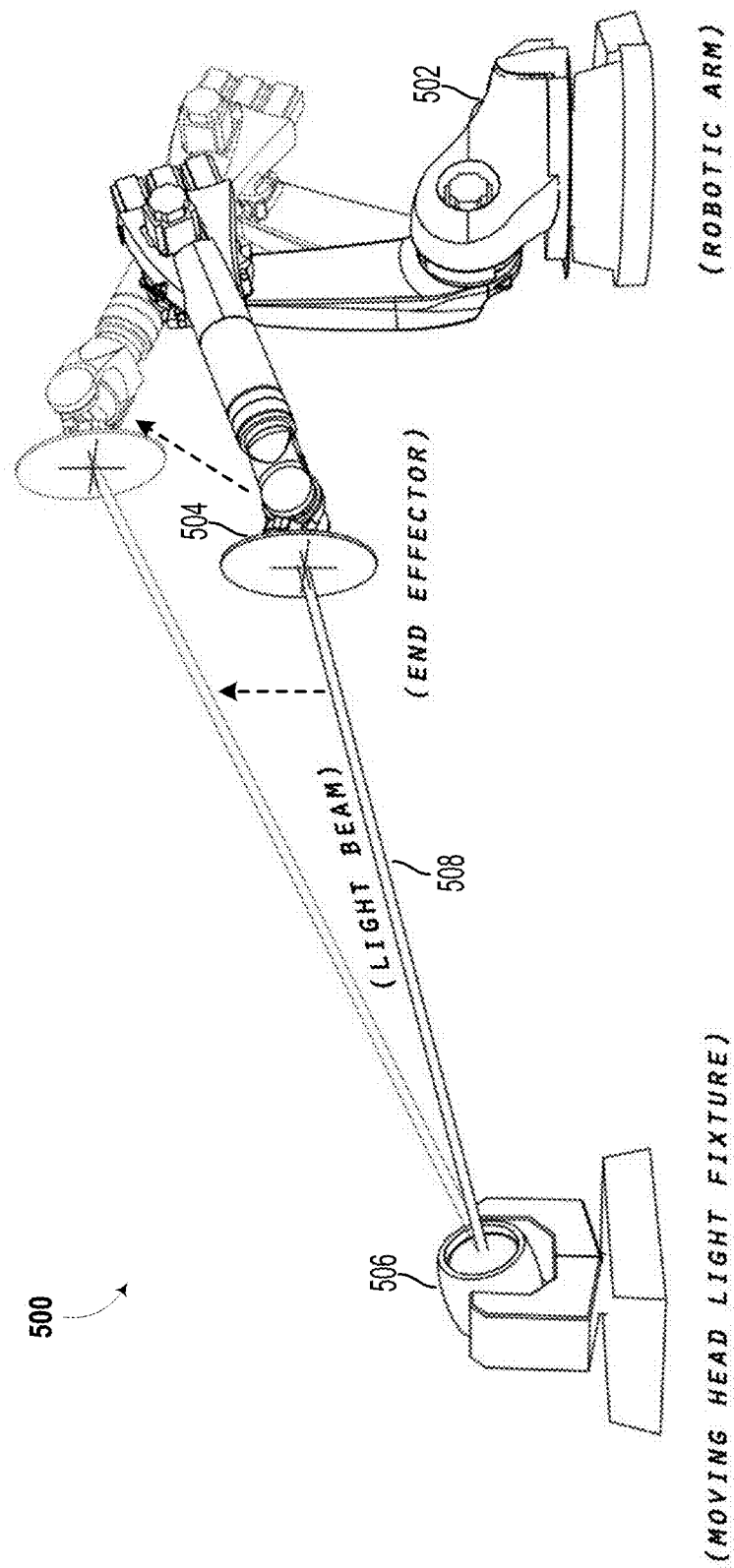
FIG. 5B illustrates coordinated movement of an end effector of a robotic device and a projected light beam, according to an example embodiment.

For example, as shown in FIG. 5B, the moving head light fixture 506 and/or the robotic arm 502 may be controlled such that the light beam 508 remains aimed at the end-effector-mounted mirror 504, as the robotic arm 502 moves the end effector 504. In some examples, the robot 502 may be controlled to move its arm (and therefore the mirror 504) over time. The light source 506 may separately be controlled to track movements of the mirror 504. For instance, a separate control system (not shown) may control the position and orientation of each of the robot 502 and the light source 506. In some examples, the control system may set the orientation and/or position of each of the robot 502 and the light source 506 so that the light source 506 stays aimed at the center of the mirror 504.

In another example, the robot 502 may be configured to be the master device actor. In such an example, the robot 502 may be able to move the mirror 504 freely in space by moving its arm along two or more degrees of freedom. A separate computing device may receive a data stream containing position and/or orientation information from the robot 502. The computing device may then serve as a control system for the light source 506. For instance, the control system may use information about the position and/or orientation of the mirror 504 over a timeline to determine a position and/or orientation of the light source 506 so that the light source 506 stays focused on the mirror 504 over time.

In a further example, the light source 506 could be configured to be the master device actor. The light source 506 may be able to move around and/or point in any direction within the surrounding physical environment. A separate computing device may receive a data stream containing position and/or orientation information about the light source 506. The computing device may then serve as a control system for the robot 502 and/or the robot arm to control the position and/or orientation of the mirror 504. The control system may first determine the direction that the light source 506 is currently aiming in real time. The control system may then use this information to determine a position and/or orientation of the mirror 504 so that the mirror 504 may be controlled to stay within the beam of light.

Figure 5C:
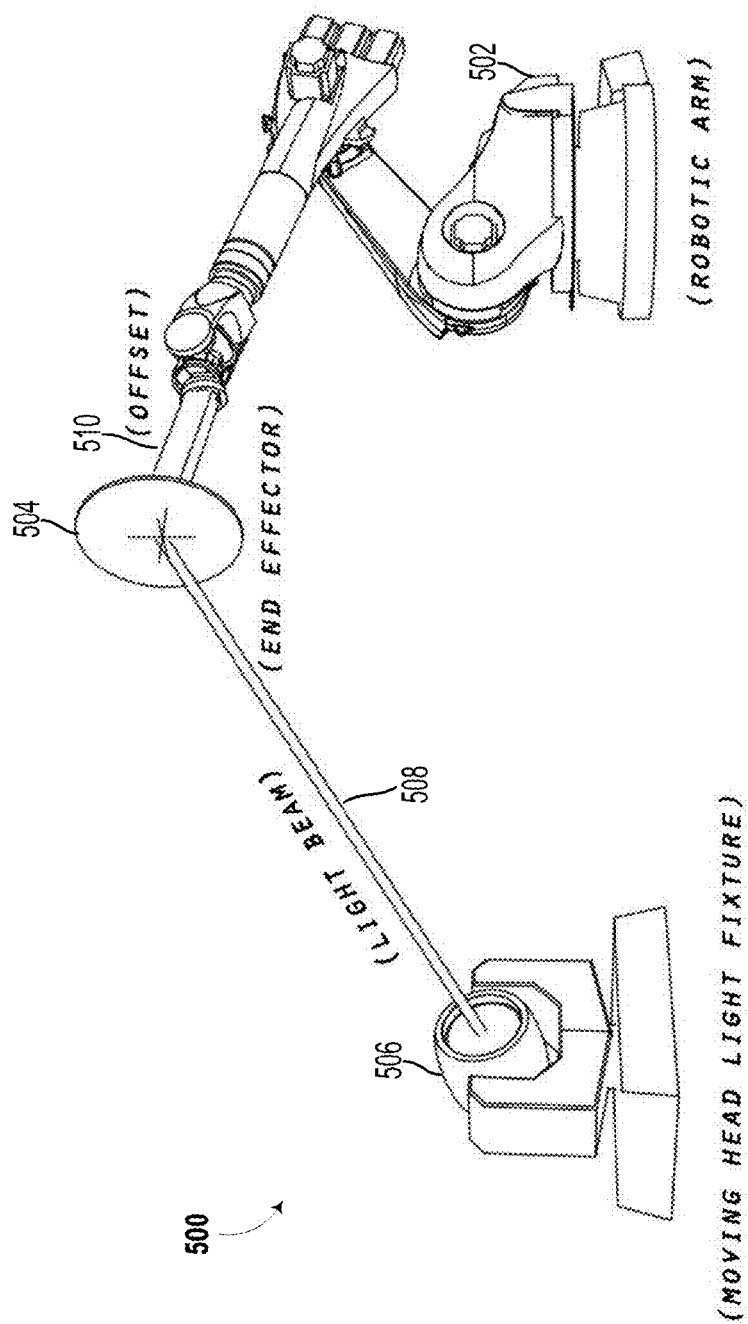
FIG. 5C illustrates a light source projecting a light beam at an end effector mounted on a robotic device with an offset, according to an example embodiment.

FIG. 5C shows another illustrative system 500 with two device actors: a robotic arm 502 with an end-effector-mounted mirror 504, and a moving head light fixture 506. In this example system, the end-effector-mounted mirror 504 is offset from the end of robotic arm 502 by a head-mount attachment 510. Further, a control system (not shown) may communicate with the robotic arm 502 and the moving head light fixture 506 to coordinate movements of the end-effector-mounted mirror 504 with movements of the light beam 508 emitted by moving head light fixture 506 to compensate for the offset attachment 510 to maintain certain relationships as the robotic arm 502 and/or the moving head light fixture 506 move.

For example, the moving head light fixture 506 and/or the robotic arm 502 may be controlled such that the light beam 508 remains aimed at the end-effector-mounted mirror 504 as the robotic arm 502 moves the end effector 504. To do so, the control system may keep light beam 508 aimed at a location at the end of the head-mount attachment 510 as the robotic arm 502 moves.

In further examples, other objects with reflective properties such as a disco ball may be attached to the head-mount attachment 510 or directly attached to the end effector instead of a mirror. These objects may be illuminated in a similar manner as end-effector-mounted mirror 504 (e.g., to illuminate the surrounding area in the example of a disco ball).

In a further aspect, the control system may use a central timeline that includes control signals for all device actors. As such, the control system may apply timing offsets to the movements of a light source and/or an end effector to create an effect of the light beam from the light source leading, following, catching up to, and/or falling behind the end effector.

Figure 5D:
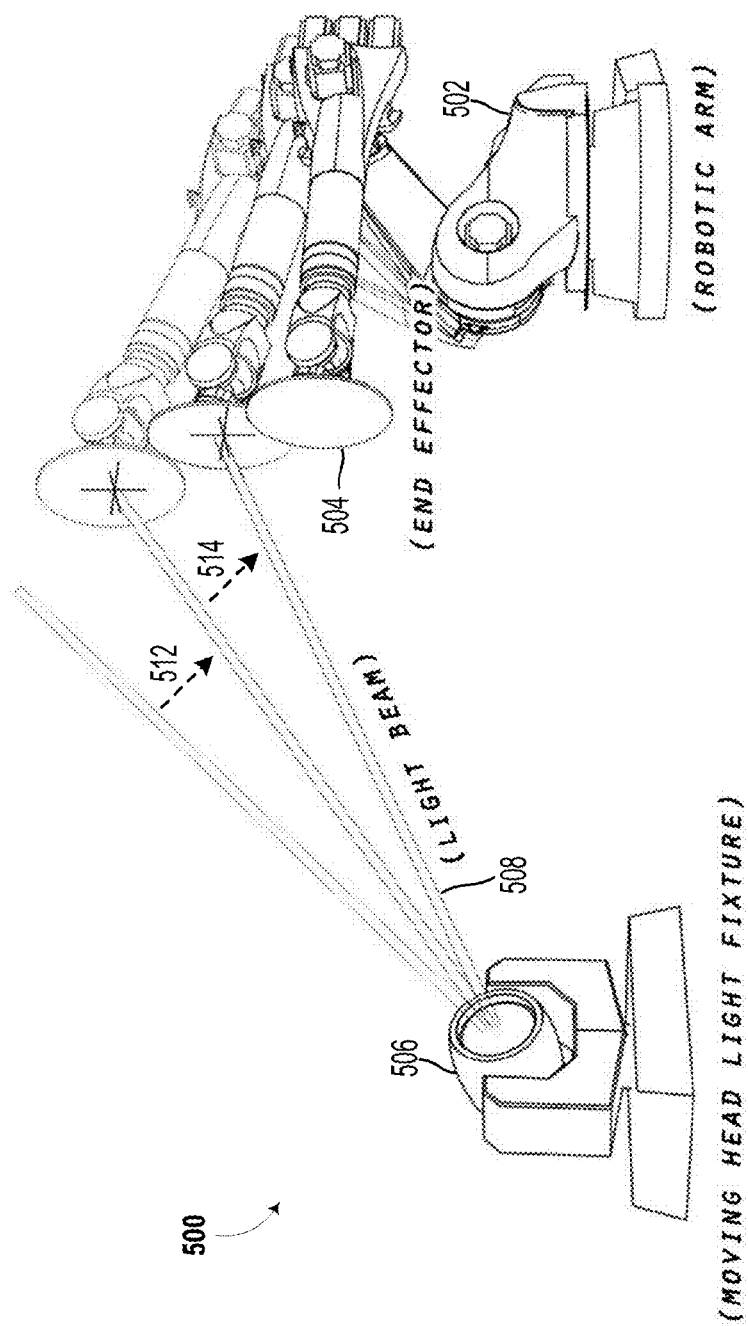
FIG. 5D illustrates additional coordinated movement of an end effector of a robotic device and a projected light beam, according to an example embodiment.

For example, FIG. 5D shows an illustrative operation of the system 500 that is shown in FIGS. 5A and 5B. More specifically, in FIG. 5D, while the light beam 508 is moved as shown by arrow 512, the robotic arm may not be commanded to move. At the end of the movement shown by arrow 512, the light beam 508 may illuminate reflector 504. At this point, the robotic arm 504 may begin to move such that the light beam 508 remains aimed at the end-effector-mounted mirror 504, as the light source moving head light fixture moves light beam 508 as shown by arrow 514. This may create the effect of the end effector leading the light beam, or the light beam catches up to the end effector. Other types of effects may also be achieved using time manipulation with an example system such as system 500 as well.

In a variation on the above-described embodiments with two actor devices, a light source that is movable with two degrees of freedom may be mounted to a first robotic arm with six degrees of freedom, and the end effector be mounted to a second robotic arm with six degrees of freedom. As such, the system may include a light source that is movable with eight degrees of freedom and an end effector, such as a mirror or disco ball, which is movable with six degrees of freedom. Other variations with two device actors are also possible.

V. Example Systems with Multiple Device Actors

Figure 6A:
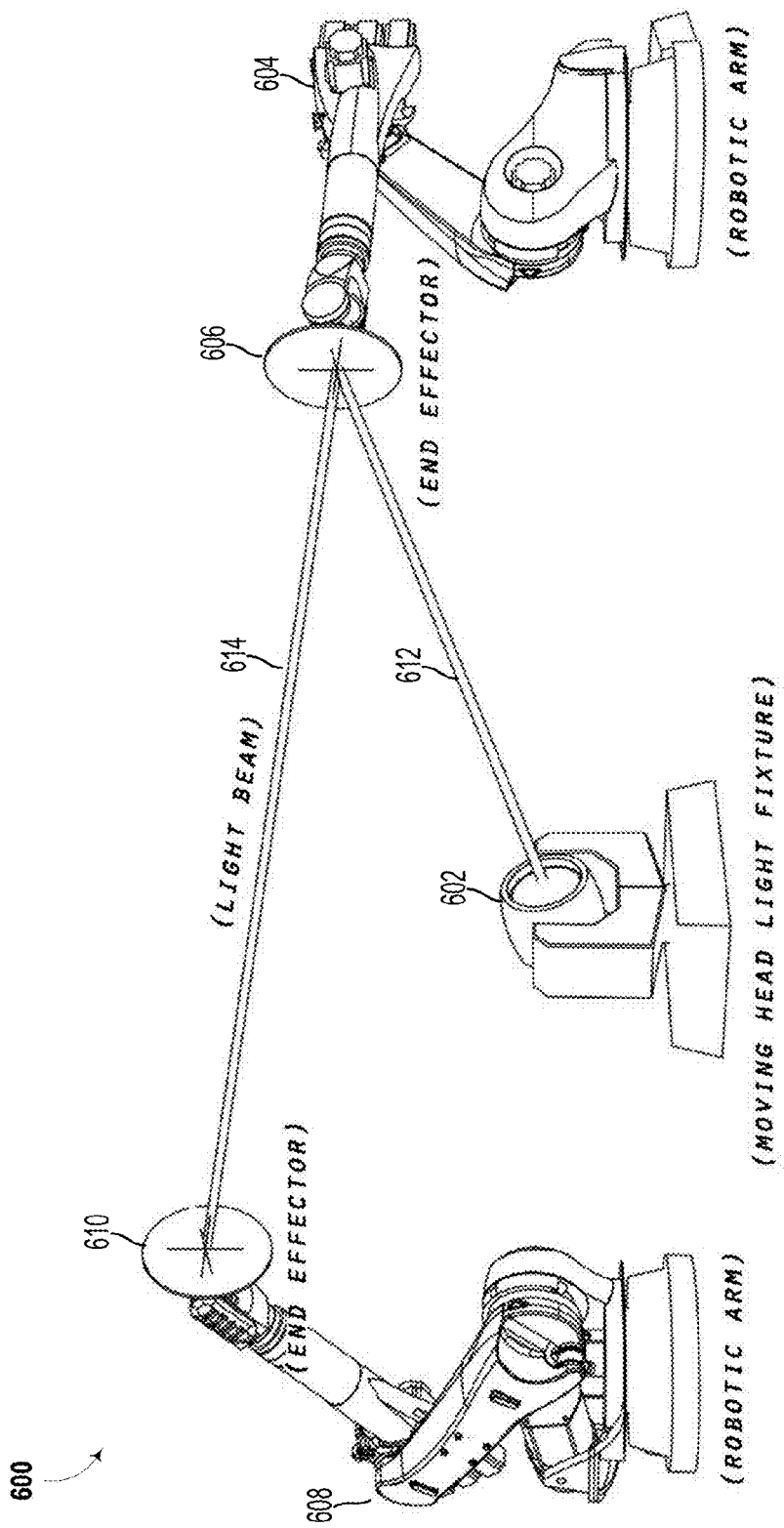
FIG. 6A illustrates a system including a light source and two robotic devices with end effectors, according to an example embodiment.
Figure 6B:
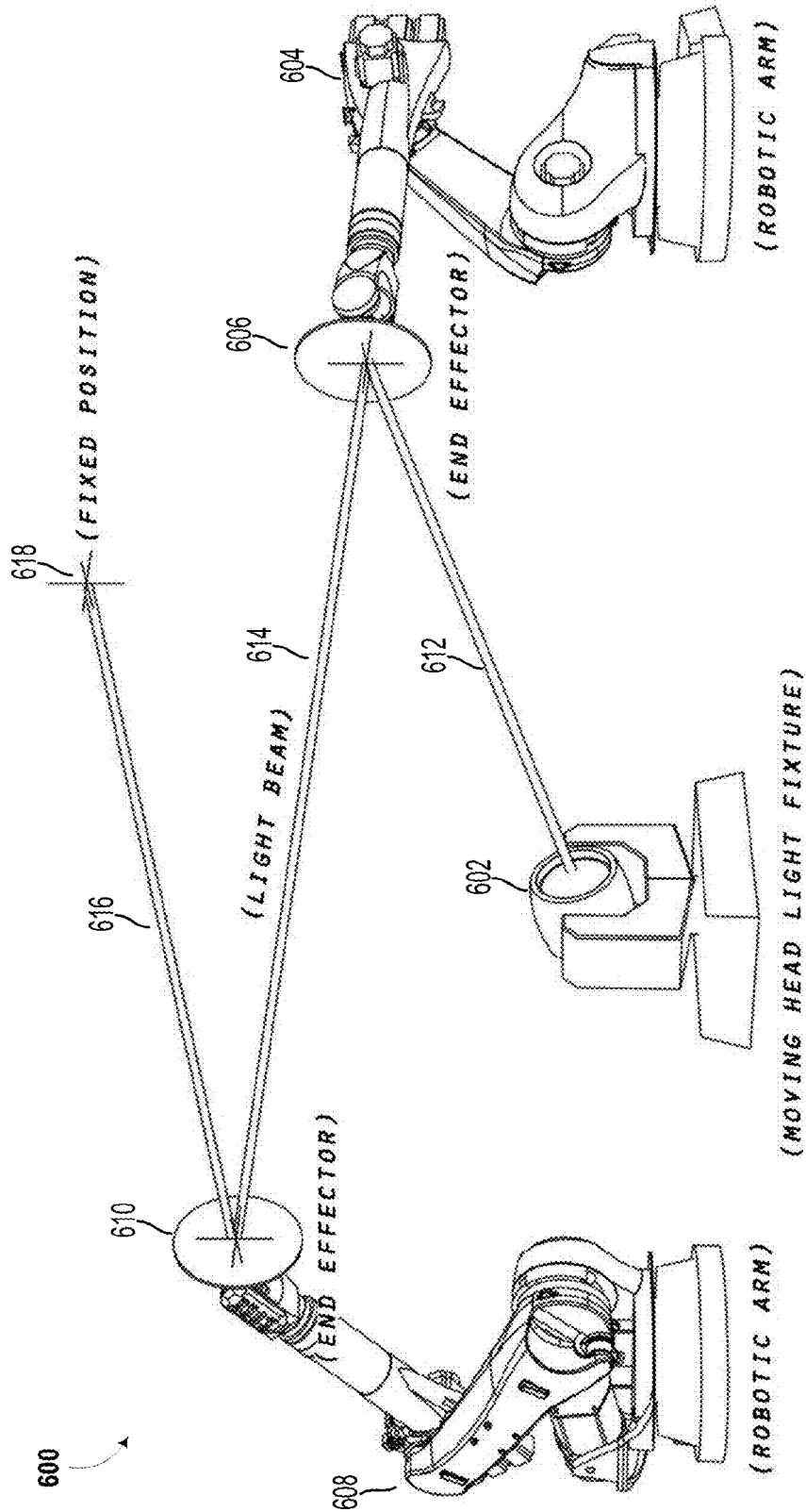
FIG. 6B illustrates reflection of a projected light beam by the light source from FIG. 6A, according to an example embodiment.

In some embodiments, an example system may include three or more device actors. For example, FIGS. 6A and 6B show an illustrative system 600 with three device actors: (a) a first robotic arm 604 with a first end effector 606, which in this case is a mirror, (b) a second robotic arm 608 with a second end effector 610, which in this case is also a mirror, and (c) a moving head light fixture 602.

Further, a control system (not shown in FIG. 6A) may communicate with the first robotic arm 604 and/or the moving head light fixture 602 to coordinate movements of the end-effector-mounted mirror 606 with movements of the light beam 612 emitted by moving head light fixture 602, such that certain relationships are maintained as the first robotic arm 604 and/or the moving head light fixture 602 move. At the same time, control system may communicate with one or both robotic arms 604 and 608 to coordinate movements of one or both end-effector-mounted mirrors 606 and 610 with movements of one or more reflected light beams 614, such that certain relationships are maintained as one or both robotic arms 604 and 608 and/or the moving head light fixture 602 move. For example, the control system may keep the reflected light beam 614 directed at end effector 610 as one or both robotic arms move.

In a further example, the control system may control the second robotic arm 608 to keep end effector 610 oriented such that end effector 610 reflects the light beam 614 directly back at end effector 606, creating the appearance of the light beam terminating at end effector 610 (since the light beam reflected back towards end effector 606 aligns with light beam 614).

In additional examples, one or both robotic arms 604 and 608 may keep end effector 610 oriented such that light beam 614 is reflected at an angle, as shown in FIG. 6B. More specifically, in FIG. 6B, when light beam 614 is incident on end effector 610, light beam 616 is reflected from end effector 610 and directed to a fixed position 618 in space. Further, the control system may coordinate the system 600 such that as one or both robotic arms 604 and 608 and/or moving head light source 602 move, the light beam 612 remains aimed at end effector 606, reflected light beam 614 remains aimed at end effector 610, and reflected light beam 616 remains aimed at the fixed position 618 in space.

In further examples, a control system (not shown) may be operable to communicate with the light source 602 and the robotic arms 604 and 68. Further, in some implementations, the control system may communicate with the end effectors 606 and 610 as well as with the robotic arms 604 and 608. In such an implementation, communications with the end effectors 606 and 610 may be conducted using the same protocol or language, or using different protocols or languages, than communications with the robotic arms 604 and 608.

The control system may send control signals to the light source 602, one or both of robotic arms 604 and 608, and/or one or both of end effectors 606 and 610. The control system may additionally or alternatively receive a data stream from the light source 602, which indicates current state information for the light source (e.g., current pose information and/or position data). In a further aspect, the control system may additionally or alternatively receive a respective data stream from one or both of robotic arms 604 and 608, which indicates the current state of the robotic arm from which the respective data stream is received. In yet a further aspect, the control system may additionally or alternatively receive a respective data stream from one or both of end effectors 606 and 610, which indicates the current state of the end effector from which the respective data stream is received.

In some cases, the control system may operate with control system as the master control for all of the device actors (e.g., tight source 602, robotic arms 604 and 608, and possibly end effectors 606 and 610 as well). In such case, the control system may send control signals to all the device actors. In other cases, the control system may operate with one of the device actors configured as a master device actor, and the remaining device actors configured as slave actors.

For example, light source 602 may be configured as the master device actor. As such, the control system may receive a first real-time data stream from the light source, which indicates the current pose and/or position of the light source 602. The control system may generate a second and a third data stream with control instructions for the robotic arms 604 and 608, respectively. The second and third data streams may be generated in real-time, as the first data stream is received from the light source 602. Further, the second and third data stream may include control instructions that change the position of the respective robotic arm 604 and 608 according to the positioning of the light source 602 indicated in the first data stream. In particular, the control system may send real-time control signals to robotic arms 604 and 608 that maintain one or more specified relationships between the two end effectors 606 and 610, and/or between the light source 602 and one of the end effectors 606 and 610. Other examples in which one of the end effectors 606 and 610 is configured as the master device actor are also possible.

As noted above, system 600 may be configured to coordinate the operation of some or all of its device actors such that a certain relationship or relationships are maintained as some or all of the device actors are moving and/or changing orientation. For example, operation of light source 602, robotic arm 604, and/or end effector 606 may be coordinated such that the light beam 612 from the light source 602 remains directed on end effector 606 as the light source 602 changes position or orientation, and/or as the robotic arm 604 changes the position or orientation of the end effector 606.

Additionally or alternatively, light source 602, one or both robotic arms 604 and 608, and/or one or both end effectors 606 and 610 may be controlled such that the light beam 614 that is reflected from end effector 606 remains directed on end effector 610 as one or more of the device actors changes position and/or orientation (e.g., as the light source 602 changes position or orientation, and/or as one or both of the robotic arms 604 and 608 change the position and/or orientation of the respective end effector 606 and 610).

Further, one or more of the device actors may be controlled such that the light beam 616 that is reflected from end effector 610 behaves in a desired manner as one or more of the device actors changes position and/or orientation. For example, the system may coordinate the light source 602, one or both robotic arms 604 and 608, and/or one or both end effectors 606 and 610 such that reflected light beam 616 remains directed on a particular point in space (e.g., a certain location on the wall, ceiling or floor of the space where the system is installed), as the light source 602, one or both robotic arms 604 and 608, and/or one or both end effectors 606 and 610 move and/or change orientation.

In further examples, the system may be coordinated so that light beams and/or reflected light beams maintain other types of constraints. For instance, one or more particular angles of reflection may be maintained for a light beam reflected off of an end effector as one or more of the components within the system move over time. More complex examples to create different types of visual effects are also possible. For instance, the pose of two end effectors mounted on two robotic arms may be driven by the motion path of a moving light source so that the end effectors maintain a geometric relationship that bounces the light through a particular pattern that maintains particular dimensions or shapes. In further examples, other effects related to the light beams (e.g., light beam width or color) and/or other types of effects (e.g., music or sound effects) may also he coordinated as part of a multimedia performance.

VI. Example Methods

Within examples, the systems described above can be implemented in the form of control logic using computer software and/or computer hardware in a modular or integrated manner. Based on the disclosure and teachings provided herein, a person of ordinary skill in the art can know and appreciate other ways and/or methods using hardware and a combination of hardware and software.

Figure 7:
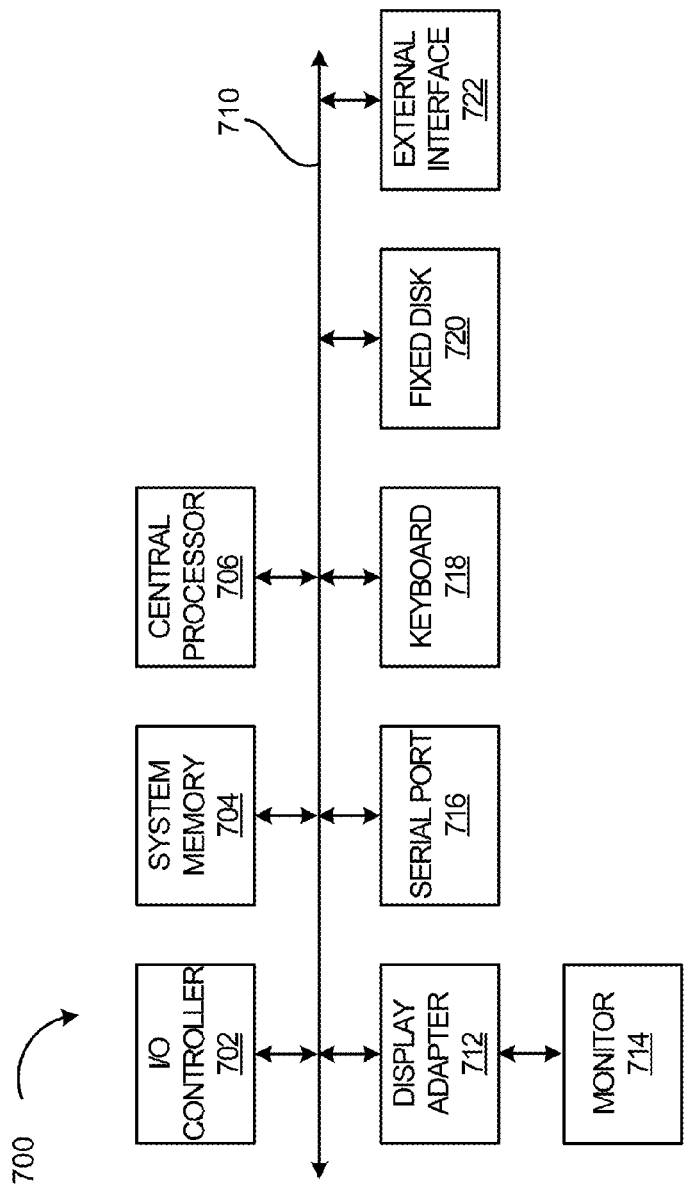
FIG. 7 shows one potential implementation of a computer or electronic device, according to an example embodiment.

FIG. 7 shows a block diagram of an exemplary computer apparatus that can be used in some embodiments (e.g., fix some of the components shown in the other figures). The subsystems shown in FIG. 7 are interconnected via a system bus 710. Additional subsystems such as a keyboard 718, fixed disk 720 (or other memory comprising computer readable media), monitor 714, which is coupled to display adapter 712, and others are shown. Peripherals and input/output (I/0) devices, which couple to I/O controller 702, can be connected to the computer system by any number of means known in the art, such as through serial port 716. For example, serial port 716 or external interface 722 can be used to connect the computer apparatus to a wide area network such as the Internet, a mouse input device, or a scanner. The interconnection via system bus 710 allows the central processor 706 to communicate with each subsystem and to control the execution of instructions from system memory 704 or the fixed disk 720, as well as the exchange of information between subsystems. The system memory 704 and/or the fixed disk 720 may embody a non-transitory computer readable medium.

Any of the software components or functions described in this application, may be implemented as software code to be executed by a processor using any suitable computer language such as, for example, Java, C, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CDROM. Any such computer readable medium may reside on or within a single computational apparatus, and may be present on or within different computational apparatuses within a system or network.

Figure 8:
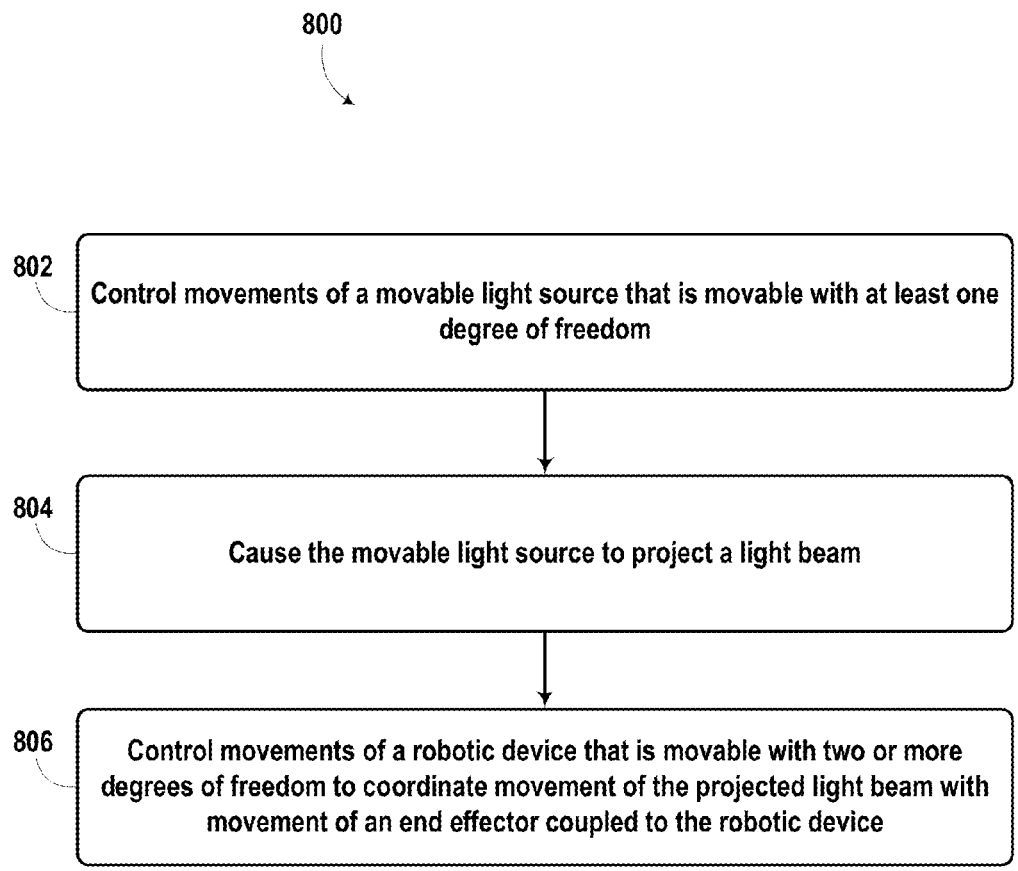
FIG. 8 is a block diagram of a method, according to an example embodiment.

FIG. 8 illustrates a flowchart showing a method 800, according to an example embodiment. In some examples, method 800 may be carried out by a control system, such as master control 10 as described in reference to FIG. 1, in communication with one or more device actors. The device actors may include any of the devices previously described, including device actors 40 as described in reference to FIG. 1, device actor 342 as illustrated and described in reference to FIGS. 3A-3D, and/or device actor 442 as described in reference to FIG. 4B. In other examples, part or all of method 800 may be carried out by one or more of the device actors and/or control systems of the device actors. Additionally, example embodiments may include any number of robotic devices and/or light sources, which may be operable with different degrees of freedom.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 8. Where used, program code can be stored on any type of computer-readable medium, for example, such as a storage device including a disk or hard drive.

In addition, each block of the flowchart shown in FIG. 8 may represent circuitry that is wired to perform the specific logical functions in the process. Unless specifically indicated, functions in the flowchart shown in FIG. 8 may be executed out of order from that shown or discussed, including substantially concurrent execution of separately described functions, or even in reverse order in some examples, depending on the functionality involved, so long as the overall functionality of the described method is maintained.

As shown by block 802 of FIG. 8, method 800 may initially involve controlling movements of a movable light source. Any of the control systems and functionality previously described may be used to position and/or direct the movable light source. In some examples, the movable light source may be operable with two degrees of freedom. In further examples, the movable light source may be mounted on a robotic device for additional degrees of freedom. For instance, a movable light source with two degrees of freedom may be mounted on a robotic arm with six degrees of freedom to achieve a total of eight degrees of freedom.

As shown by block 804 of FIG. 8, method 800 may also involve causing the movable light source to project a light beam. In some examples, the light beam may be continuously projected as the movable light source is moved and/or positioned by a control system. In other examples, the light beam may be projected only at certain times or for certain periods of time. In further examples, multiple light beams may also be projected as part of method 800.

As shown by block 806 of FIG. 8, method 800 may additionally involve controlling movements of a robotic device that includes an end effector. More specifically, the robotic device may be controlled to coordinate movement of the projected light beam from the movable light source with movement of the end effector. Any of the control systems or functionality previously described for coordinating movement of the projected light beam with movement of the end effector may be used. In particular examples, the robotic device may be slaved to the light source, the light source may be slaved to the robotic device, or both the robotic device and the light source may he slaved to a common control system. In further examples, the end effector may be a mirror, a disco ball, a prism, and/or a different type of reflective surface. In additional examples, movements of one or more additional device actors including additional robotic devices with reflective end effectors and/or additional movable light sources may also be coordinated as part of method 800.

VII. Conclusion

Embodiments are not limited to the above-described embodiments. For example, throughout the description, various examples of device actors, robots, and light sources are presented for use in lighting systems. The embodiments are not limited to the general or specific examples provided herein, but may include other embodiments apparent to a person of ordinary skill in the art from the above descriptions.

We claim:

1. A system comprising:
    a first device actor comprising an end effector coupled to a robotic device, wherein the robotic device has two or more degrees of freedom;
    a second device actor comprising a movable light source, wherein the movable light source has at least one degree of freedom; and
    a control system that is configured to:
        receive a first data stream that indicates a pose of the movable light source;
        as the first data stream is being received, generate a second data stream for control of the robotic device, wherein the second data stream comprises instructions that coordinate a pose of the end effector with the indicated pose of the movable light source so as to keep a light beam from the movable light source directed at the end effector as at least one of the movable light source and the end effector moves; and
        send the second data stream to the robotic device to control movements of the robotic device to coordinate movement of the light beam from the moveable light source with movement of the end effector.

2. The system of claim 1, wherein the robotic device comprises a robotic arm that is movable with six degrees of freedom.

3. The system of claim 1, wherein the end effector comprises a disco ball.

4. The system of claim 1, wherein the end effector comprises at least one mirror.

5. The system of claim 1, wherein the movable light source comprises a movable head light fixture.

6. The system of claim 1, wherein the control system is configured to control movements of both the first device actor and the second device actor in order to coordinate movement of the light beam with movement of the end effector based on one or more relational parameters, wherein each relational parameter is indicative of a relationship between the movable light source and the end effector.

7. The system of claim 1, further comprising at least one additional device actor comprising at least one additional end effector coupled to at least one additional robotic device, wherein the control system is further configured to control movements of the at least one additional device actor to coordinate movement of the light beam from the movable light source with movement of the end effector of the at least one additional device actor.

8. The system of claim 1, further comprising at least one additional device actor comprising at least one additional movable light source, wherein the control system is further configured to control movements of one or more additional light beams from the at least one additional movable light source of the at least one additional device actor with movement of the end effector.

9. A system comprising:
    a first device actor comprising a first robotic device and an end effector coupled to the first robotic device, wherein the first robotic device is operable to move the end effector with two or more degrees of freedom;
    a second device actor comprising a second robotic device and a light source coupled to the second robotic device, wherein the second robotic device comprises a robotic arm that is operable to move the light source with at least six degrees of freedom; and
    a control system that is configured to control movements of at least one of the first robotic device and the second robotic device to coordinate movement of a light beam from the light source with movement of the end effector.

10. The system of claim 9, wherein the end effector comprises at least one reflective surface.

11. The system of claim 9, wherein the light source comprises a movable light source having at least two degrees of freedom, such that the light source is movable with at least eight degrees of freedom in total.

12. The system of claim 11, wherein the control system is configured to control movement of at least one of the first robotic device, the second robotic device, and the light source, such that as at least one of the light source and the end effector move: (a) the light beam from the light source is reflected by the end effector to provide a reflected light beam and (b) the reflected light beam remains directed towards a particular location.

13. The system of claim 9, wherein the light source comprises a movable head light fixture having an interface for real-time control.

14. The system of claim 9, wherein the control system is configured to control movement of at least one of the first robotic device, the second robotic device, and the light source, so as to keep the light beam from the light source directed on the end effector as at least one of the light source and the end effector move.

15. The system of claim 9, wherein the control system is configured to control movement of at least one of the first robotic device, the second robotic device, and the light source to maintain at least one of: (a) one or more positioning characteristics of the light beam between the light source and the end effector, (b) one or more positioning characteristics of a reflected light beam that is reflected from the end effector, and (c) one or more reflective characteristics of the end effector.

16. A computer-implemented method, comprising:
receiving a first data stream that indicates a pose of at least one of a robotic device and an end effector coupled to the robotic device;
as the first data stream is being received, generating a second data stream for control of a movable light source, wherein the second data stream comprises instructions that coordinate a pose of the movable light source with the indicated pose of the at least one of the robotic device and the end effector so as to keep a light beam from the movable light source directed at the end effector as at least one of the movable light source and the end effector moves;
controlling, by a computing device, movements of the movable light source based on the generated second data stream to coordinate movement of the light beam from the moveable light source with movement of the end effector; and
causing the movable light source to project the light beam.

17. A system comprising:
a first device actor comprising an end effector coupled to a robotic device, wherein the robotic device has two or more degrees of freedom, wherein the end effector comprises at least one of a disco ball and at least one mirror;
a second device actor comprising a movable light source, wherein the movable light source has at least one degree of freedom; and
a control system that is configured to control movements of at least one of the first and second device actors to coordinate movement of a light beam from the movable light source with movement of the end effector.

* * * * *